H. T. MORRIS.
SYSTEM OF CONTROL.
APPLICATION FILED DEC. 29, 1915.
1,302,068.
Patented Apr. 29, 1919.
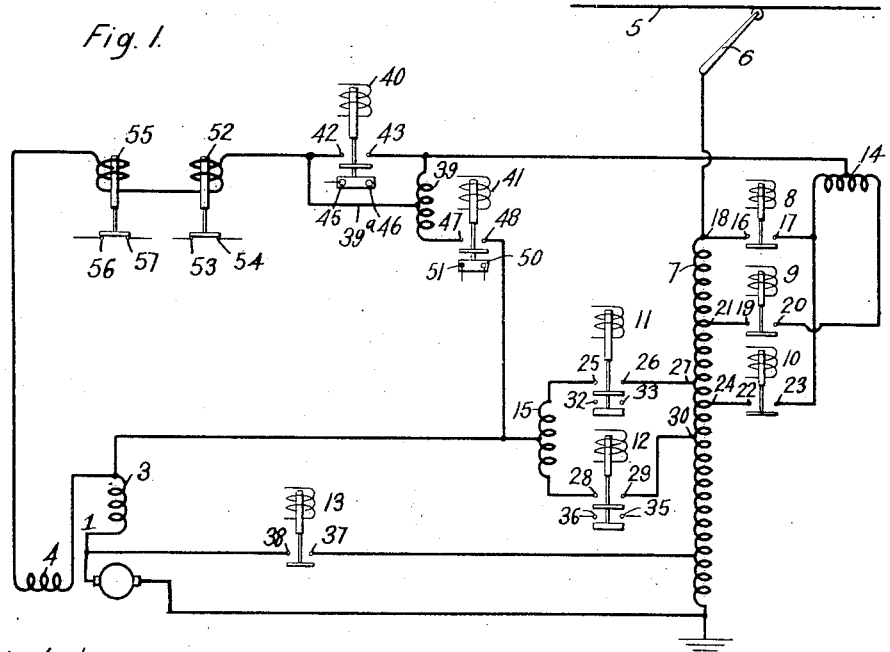
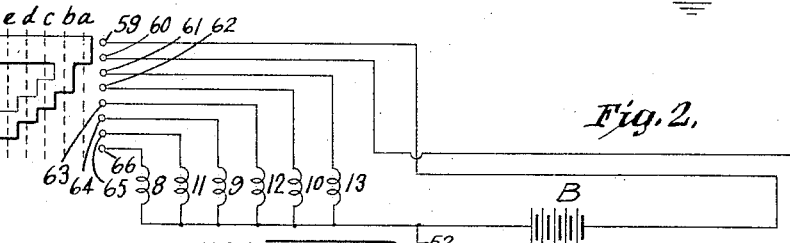
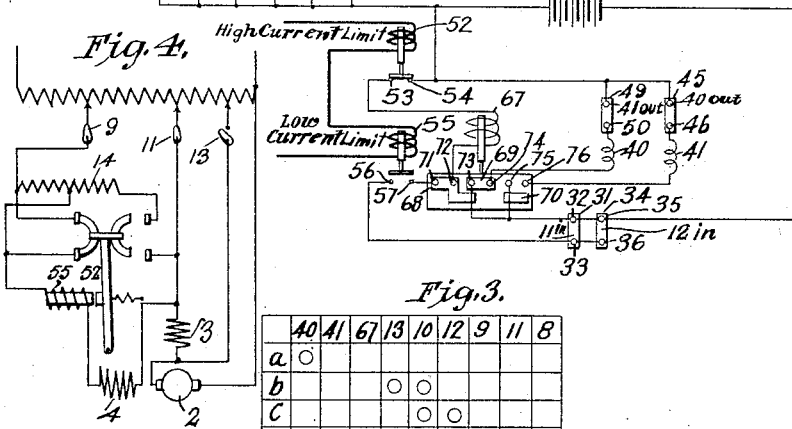
WITNESSES:
INVENTOR
Hurd T. Morris
BY
Wesley G. Carr
ATTORNEY

UNITED STATES PATENT OFFICE.

HURD T. MORRIS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,302,068.

Specification of Letters Patent.  Patented Apr. 29, 1919.

Application filed December 29, 1915.  Serial No. 69,182.

*To all whom it may concern:*

Be it known that I, HURD T. MORRIS, a citizen of the United States, and a resident of Wilkinsburg, in the county of Allegheny and State of Pennsylvania, have invented a new and useful Improvement in Systems of Control, of which the following is a specification.

My invention relates to control systems for electric vehicles and particularly to control systems provided with alternating-current commutating motors of the doubly-fed type.

One object of my invention is to provide a control system of the above indicated character provided with motors, having exciting and inducing field-magnet windings, that shall be started as repulsion motors and shall be operated as doubly-fed motors.

Another object of my invention is to provide a control system, for motors of the above indicated character, with means whereby the voltage supplied to the inducing field windings shall be varied in accordance with the current supplied thereto.

A further object of my invention is to provide a control system, of the above indicated character, with automatic means for varying the voltage impressed on the inducing field windings that shall be controlled by the amount of the current flowing through the inducing field windings.

More specifically, the object of my invention is to provide a control system with means that shall reduce the voltage supplied to the inducing field windings in case the value of the current falls below a predetermined low limit, and with means that shall again raise the voltage supplied to the inducing windings in case the value of the current supplied thereto is raised above a predetermined amount.

It has been found necessary to reduce the voltage of the current supplied to the inducing field windings of a doubly-fed motor whenever the current supplied to the same falls below a predetermined value. The above object may be accomplished by shifting to a lower tap on the main transformer or by establishing a shunt circuit around the inducing field windings. However, according to my invention, the above object is accomplished by means of a separate autotransformer which may be connected across a portion of the main transformer winding.

In the accompanying drawings illustrating my invention, Figure 1 is a diagrammatic view of the main power circuits of a control system constructed in accordance with my invention; Fig. 2 is a diagrammatic view of the auxiliary control circuits, Fig. 3 is a chart showing the sequence in which the switches are operated, and Fig. 4 is a diagrammatic view of the circuit relations for a particular position of the controller.

Referring to the drawings, an alternating-current motor 1 of the commutator type is provided with an armature 2 and with an exciting field winding 3 and an inducing field winding 4. The motor 1 is supplied with power from a trolley conductor 5 through a trolley 6 and a main transformer 7 and is controlled by a set of switches 8, 9 and 10 and by a second set of switches 11 and 12. A switch 13 is provided for establishing a short circuit around the armature 2 when the motor is operated as a repulsion motor. Preventive coils 14 and 15 are provided for preventing the short circuiting of any portion of the main transformer 7 when shifting from one transformer tap to another.

In the first set of switches, the switch 8 is adapted to bridge contact terminals 16 and 17 to connect transformer tap 18 to the preventive coil 14. The switch 9 is adapted to bridge contact terminals 19 and 20 to connect transformer tap 21 to the preventive coil 14. The switch 10 is adapted to bridge contact terminals 22 and 23 to connect a transformer tap 24 to the preventive coil 14. In the second set of switches, the switch 11 is adapted to bridge contact terminals 25 and 26 to connect transformer tap 27 to the preventive coil 15, and the switch 12 is adapted to bridge contact terminals 28 and 29 to connect a transformer tap 30 to the preventive coil 15. The switch 11 is provided with an interlock which is adapted to bridge contact terminals 32 and 33, and the switch 12 is provided with an interlock which is adapted to bridge contact terminals 35 and 36. The switch 13 is adapted to bridge contact terminals 37 and 38.

An auto-transformer 39 is provided for regulating the voltage that is supplied to the inducing field windings 4 in accordance with the motor load current and is controlled by mutually interlocked switches 40 and 41. Current relays 52 and 55 and an auxiliary relay 67 control the operation of the switches 40 and 41. Fig. 2 illustrates the conditions that obtain when normal motor current is flowing, in which case the low-current relay 55 is raised and the switch 40 is closed by being energized through the interlock 69 of relay 67 and the interlock 41—out. The actuation of the high-current relay has no effect upon the circuit relations thus established but a sufficient decrease in the current value to permit the low-current relay 55 to close energizes the operating coil of the relay 67 and causes the switch 40 to open and the switch 41 to close by completing a circuit for the coil of switch 41 from the battery through interlocks 70 and 40—out. With the relay 67 in its uppermost position, a holding circuit for the same is completed through interlock 68. An increase of the motor current to a value sufficiently large to raise the relay 52 will, under the prevailing conditions, deënergize the relay 67 and thereby reëstablish the circuit conditions for normal motor current.

The coils of the switches 8 to 13, inclusive, are energized by current supplied from a battery B and are controlled by a master controller MC which embodies a movable contact segment 58 and a plurality of contact fingers 59 to 66, inclusive, that are adapted to engage the segment 58 for certain of the controller positions a, b, c, d and e.

With the system in position shown in Figs. 1 and 2, the motor 1 may be started as a repulsion motor by successively moving the master controller MC to positions a and b and may be operated as a doubly-fed motor by moving the master controller successively to positions c, d, e and f. In moving the master controller MC to position a, the contact segment 58 bridges the contact fingers 59 and 60, whereby a circuit is established which may be traced from one terminal of the battery B through contact finger 59, controller segment 58, contact finger 60, contact terminal 73, interlock 69, contact terminal 74, coil of auxiliary switch 40, contact terminals 49 and 50, and interlock 41—out to the other terminal of the battery B. Thus, the coil of the auxiliary switch 40 is energized, and the switch bridges contact terminals 42 and 43 to connect one terminal of the auxiliary windings 4 to the preventive coil 14. When the master controller is moved to position b, the controller segment 58 bridges contact terminals 60, 61 and 62 and establishes a circuit which may be traced from one terminal of the battery B to contact finger 59, controller segment 58 and contact fingers 60, 61 and 62 and the energizing coils for switches 13 and 10, in parallel, to the other terminal of the battery B. The switch 13 engages contact terminals 38 and 37 to close a circuit around the armature 2. The switch 10 engages contact terminals 22 and 23 and establishes a circuit which may be traced from the transformer tap 24, through contact terminals 22 and 23, switch 10, preventive coil 14, contact terminals 42 and 43, switch 40, coils of the limit switches 52 and 55, inducing and exciting field windings 4 and 3, contact terminal 38, switch 13, and contact terminal 37 to the transformer 7. Thus, the motor 1 is operated as a repulsion motor.

The motor 1 is operated as a doubly-fed motor when the master controller MC is in positions c, d, e or f, and, in explaining the operation of the system for the above controller positions, it will be assumed that normal current is flowing through the circuit of the auxiliary winding 4 and the high and low-current relays 52 and 55. When the master controller MC is moved to position c, the controller segment 58 engages contact terminal 63 and is disengaged from the contact terminal 61. Thus, the coil of the switch 13 is deënergized, the coil of switch 12 is energized, and the coil of the switch 10 remains energized. The closing of switches 10 and 12 establishes two circuits, one through the inducing field winding 4 and another through the exciting field windings 3 and the armature 2. The circuit through the inducing field winding may be traced from the tap of the main transformer 7 through the contact terminals 22 and 23, switch 10, preventive coil 14, contact terminals 42 and 43, switch 40, high and low-current relays 52 and 55, inducing windings 4, preventive coil 15, contact terminal 28, switch 12 and contact terminal 29 to the tap 30 of the main transformer 7. The circuit through the main field windings and the armature 2 may be traced from the preventive-coil 15, main field windings 3 and the armature 2 to the main transformer 7. In moving the master controller successively to positions d, e and f, switches 8 and 11 are operated to impress various voltages upon the inducing field windings 4, exciting field windings 3 and the armature 2.

Fig. 4 represents the simplified connections for position e.

In case the current flowing through the circuit of the inducing field windings 4 falls below the amount necessary to energize the low current relay 55, when the motor 1 is operating as a doubly-fed motor, the relays 52 and 55 bridge contact terminals 53 and 54 and 56 and 57, respectively. Thus, a circuit is established which may be traced from one terminal of the battery B through contact finger 59, controller segment 58, interlock 11—in or 12—in, according to whether switch 11 or switch 12 is in a closed position, contact terminals 56 and 57, relay 55, contact terminals 71 and 72, interlock 68, coil of the auxiliary relay 67, contact terminal 53, high-current relay 52 and contact terminal 54 to the other terminal of the battery B. Thus, the auxiliary relay 67 is operated, the interlock 69 is disengaged from contact terminals 73 and 74, the interlock 70 engages contact terminals 75 and 76 and the interlock 68 is disengaged from contact terminal 71 and engages contact terminal 73. Accordingly, the coil of the switch 40 is deënergized and the coil of the switch 41 is energized. In this operation, the interlocks 40—out, 41—out, 69 and 70 prevent the switches 40 and 41 from being simultaneously operated to short-circuit any portion of the auto-transformer 39. The operating of switch 41 to bridge contact terminals 47 and 48 will connect the auto-transformer 39 across the circuit of the inducing windings 4, and the opening of the switch 40 will allow a tap 39ª of the auto-transformer 39 to supply any predetermined voltage to the inducing windings 4.

In case the current flowing through the circuit of the inducing windings 4 is raised to a value that will operate the high-current relay 52, the circuit for the coil of the auxiliary relay 67 will be broken and the initial circuits will be reëstablished. The circuit through the coil of the auxiliary relay 67, which is broken by the high-current relay 52 and is established when the coil of the auxiliary relay 67 is energized through the low current relay 55, may be traced from one terminal of the battery B through contact finger 59, controller segment 58, contact finger 60, contact terminal 73, interlock 68, contact terminal 72, coil of the auxiliary relay 67, contact terminal 53, relay 52 and contact terminal 54, to the other terminal of the battery B.

Various modifications in the system and improvements in the operation thereof may be effected without departing from the spirit and scope of my invention, and I desire, therefore, that only such limitations shall be imposed as are indicated in the appended claims.

I claim as my invention:

1. In a control system, the combination with a commutator motor having armature and field-magnet windings, of limit switches in the circuit of said field windings and electro-responsive means controlled by said limit switches for automatically varying the voltage supplied to the field windings in direct proportion to the value of the current supplied thereto.

2. In a control system, the combination with an alternating-current motor having armature and field-magnet windings, and an auto-transformer, of limit switches in the circuit of said field windings and electro-responsive means controlled by said limit switches for governing the operation of said auto-transformer to automatically vary the voltage supplied to the field windings in direct proportion to the value of the current supplied thereto.

3. In a control system, the combination with a motor having inducing field-magnet windings, and a source of current therefor, of means for reducing the voltage supplied to the inducing field windings in case the current supplied thereto falls below a predetermined value.

4. In a control system, the combination with an alternating-current motor of the commutator type having inducing field-magnet windings, of switching means for connecting said motor as a doubly-fed motor, and electro-responsive means for varying the voltage supplied to the inducing field windings in accordance with the current supplied thereto.

5. In a control system, the combination with an alternating-current motor of the commutator type having exciting and inducing field-magnet windings, an auto-transformer connected to the circuit of said inducing field windings, and limit switches in the circuit of said inducing field windings, of means controlled by said limit switches for governing the operation of said auto-transformer to vary the voltage supplied to said inducing field windings in accordance with the value of the current supplied thereto.

6. In a control system, the combination with an alternating-current motor of the commutator type having exciting and inducing field-magnet windings, and a source of alternating current therefor, of electro-responsive means for automatically reducing the voltage supplied to the inducing field windings in case the current supplied thereto falls below a predetermined value and for increasing the voltage supplied to the inducing fields in case the current rises above a predetermined value.

7. In a control system, the combination with an alternating-current motor of the commutator type having exciting and inducing field-magnet windings, a source of alternating current, and an auto-transformer adapted to be disposed across a portion of said source of current, of current relays for controlling the connection of said auto-transformer to said course for varying the voltage supplied to said inducing field in accordance with the value of the current supplied thereto.

8. In a control system, the combination with an alternating-current motor of the commutator type having field-magnet windings, a source of alternating current, an auxiliary transformer, switches for connecting the respective ends of said transformer to different field-magnet windings, one of said switches being initially closed and the other of said switches being initially open, an auxiliary relay, a low-current relay adapted to energize said auxiliary relay when the motor current decreases to a predetermined low value, said auxiliary relay being adapted to deënergize said initially closed switch and to close said initially open switch, and a high-current relay adapted to deënergize said auxiliary relay and return said switches to their initial position when the motor current increases above a predetermined value.

9. In a control system, the combination with an alternating-current motor of the commutator type having stator windings, a main transformer for supplying current to said motor, switches for connecting one terminal of said windings to the main transformer, an auto-transformer, means for controlling the operation thereof, high and low current relays disposed in the circuit of said windings, and an auxiliary relay controlled by said high and low-current relays, said relays and said switches being adapted to govern the operation of said auto-transformer controlling means to vary the voltage of the current supplied to said windings in accordance with the current supplied thereto.

10. In a control system, the combination with a main supply transformer, and a single-phase commutator motor having an inducing field winding, of an auxiliary transformer, electro-responsive means comprising a low-current relay for connecting said inducing field winding across a portion of said auxiliary transformer and said auxiliary transformer across a portion of said main transformer when the motor current decreases to a predetermined small value, and a high-current relay for connecting said inducing field winding across a portion of said main transformer and for disconnecting said auxiliary transformer when the motor current increases to a predetermined large value.

11. In a control system, the combination with a main transformer and a commutator motor having an armature circuit and an inducing field-winding circuit, each of said circuits being connected across portions of said main transformer, of an auxiliary transformer, and electro-responsive means for automatically connecting said inducing field circuit across a portion of said auxiliary transformer when predetermined operating conditions prevail, and switching means for connecting said auxiliary transformer across a portion of said main transformer.

In testimony whereof, I have hereunto subscribed my name this 20th day of Dec., 1915.

HURD T. MORRIS.

Copies of this patent may be obtained for five cents each, by addressing the "Commissioner of Patents, Washington, D. C."